United States Patent
Kononov et al.

(10) Patent No.: US 10,373,135 B2
(45) Date of Patent: Aug. 6, 2019

(54) SYSTEM AND METHOD FOR PERFORMING SECURE ONLINE BANKING TRANSACTIONS

(71) Applicant: AO Kaspersky Lab, Moscow (RU)

(72) Inventors: Eldar M. Kononov, Moscow (RU);
Anton S. Lapushkin, Moscow (RU);
Dmitry Y. Lukasevich, Moscow (RU);
Konstantin M. Filatov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 334 days.

(21) Appl. No.: 15/438,106

(22) Filed: Feb. 21, 2017

(65) Prior Publication Data
US 2018/0101831 A1    Apr. 12, 2018

(30) Foreign Application Priority Data
Oct. 10, 2016 (RU) ................................. 2016139472

(51) Int. Cl.
*G06Q 20/10* (2012.01)
*G06Q 20/40* (2012.01)

(52) U.S. Cl.
CPC ......... *G06Q 20/108* (2013.01); *G06Q 20/405* (2013.01); *G06Q 20/4014* (2013.01)

(58) Field of Classification Search
CPC ................................ G07D 11/60; G07D 11/20
USPC .................................. 235/379, 375, 382, 487
See application file for complete search history.

(56) References Cited

U.S. PATENT DOCUMENTS

| | | | |
|---|---|---|---|
| 8,806,592 B2 | 8/2014 | Ganesan | |
| 9,183,383 B1 | 11/2015 | Yablokov et al. | |
| 2004/0098607 A1 | 5/2004 | Alagna et al. | |
| 2006/0235796 A1 | 10/2006 | Johnson et al. | |
| 2012/0158541 A1 | 6/2012 | Ganti et al. | |
| 2013/0298192 A1 | 11/2013 | Kumar et al. | |
| 2014/0122343 A1 | 5/2014 | Einav et al. | |
| 2014/0279507 A1* | 9/2014 | Whitler | G06Q 20/4016 705/44 |

(Continued)

FOREIGN PATENT DOCUMENTS

JP       2015-088184 A       5/2015

*Primary Examiner* — Edwyn Labaze
(74) *Attorney, Agent, or Firm* — Arent Fox LLP; Michael Fainberg

(57) ABSTRACT

A method and system is provided for performing secure online banking transactions. An example method includes: collecting data related to at least one transaction of the online banking operation requested by a user device; creating a plurality of verification scripts based at least on the collected data, wherein each verification script comprising at least one rule requiring collection of one or more types of identification data associated with the transaction, and wherein different verification scripts comprises different rules for collecting different types of identification data associated with the transaction of the banking operation; executing the plurality of verification scripts to collect the required identification data; determining a level of security of performing the banking operation based at least on the identification data collected by the plurality of verification scripts; and determining whether to perform or not to perform the requested banking operation based on the determined level of security.

20 Claims, 4 Drawing Sheets

(56) References Cited

U.S. PATENT DOCUMENTS

2014/0373093 A1* 12/2014 Wood ................. G06Q 20/4014
           726/3
2015/0088733 A1   3/2015 Monastyrsky et al.
2016/0149937 A1   5/2016 Katmor et al.

* cited by examiner

SYSTEM AND METHOD FOR PERFORMING SECURE ONLINE BANKING TRANSACTIONS

CROSS-REFERENCE TO RELATED APPLICATIONS

This application claims benefit of priority under 35 U.S.C. 119(a)-(d) to a Russian Patent Application No. 2016139472 filed Oct. 10, 2016, which is incorporated by reference herein.

FIELD OF TECHNOLOGY

The present application related generally to the field of cybersecurity and, more particularly, to systems and methods for performing secure online banking transactions.

BACKGROUND

The rapid development of computer technologies in the past decade, as well as the widespread use of various computing devices (personal computers, notebooks, and so forth), and especially mobile devices (tablets, smartphones, and so forth), have become a powerful stimulus to the use of these devices in diverse areas of activity and for an enormous number of tasks (from Internet surfing to bank transfers and electronic document traffic). In parallel with the growth in the number of computing devices and software running on these devices, the number of malicious programs has also grown at a rapid pace.

At present there exists an enormous number of varieties of malicious programs. Some of them steal personal and confidential data from the devices of users (such as logins and passwords, banking particulars, electronic documents), others form so-called botnets from user devices for cyberattacks, such as denial of service (DDOS) or for hacking of passwords by the brute force method, carried out against other computers or computer networks, still others block access to user data (electronic document traffic, photographs, and so forth), and a fourth kind propose paid content to users via annoying advertising, paid subscriptions, sending of texts to premium rate numbers and so forth.

One of the most dangerous varieties of malicious programs for users are the so-called "bankers"—applications which steal from user devices their banking particulars, logins and passwords for access to bank accounts and so forth. Moreover, such applications modify transactions being sent between user devices and bank servers. For this purpose, the legitimate banking applications installed on the user devices are modified or substituted (for example, the users are provided with modified banking applications with an embedded malicious functionality through fake bank sites). Such malicious programs are able to cause significant financial loss to the users.

Therefore, there is a need for technologies that improve improve security of online banking transactions and protect banks against unauthorized remote access.

SUMMARY

Disclosed are systems and methods for performing secure online banking transactions. In one exemplary aspect, the method includes collecting data related to at least one transaction of the online banking operation requested by a user device; creating a plurality of verification scripts based at least on the collected data, wherein each verification script comprising at least one rule requiring collection of one or more types of identification data associated with the transaction of the banking operation, and wherein different verification scripts comprises different rules for collecting different types of identification data associated with the transaction of the banking operation; executing the plurality of verification scripts to collect the required identification data; determining a level of security of performing the banking operation based at least on the identification data collected by the plurality of verification scripts; and determining whether to perform or not to perform the requested banking operation based on the determined level of security.

In one exemplary aspect, the data related to related to at least one transaction of the online banking operation comprises at least one of the following: authorization data for accessing a bank account; information relating to a type of the banking operation being requested; a sum of money involved in the banking operations being requested; data confirming performing the banking operation; and supplemental information relating to the banking operation being requested or to modifications of the bank account.

In one exemplary aspect, the verification script includes at least one of: one or more rules for collecting the identification data; one or more methods for collecting the identification data; and one or more the conditions for collecting the identification data.

In one exemplary aspect, the identification data comprise at least one of: a dump of an RAM of the user device; logs of network activities of applications running on the user device; logs of function calls from applications running on the user device; security policies running on the user device; data being transmitted between applications running on the user device and methods employed in transmitting the data; and characteristics of applications running on the user device.

In one exemplary aspect, executing the verification script to collect the identification data comprises at least one of: encrypting the collected identification data; archiving the collected identification data; computing convolutions of the collected identification data; or computing check sums from the collected identification data.

In one exemplary aspect, determining a level of security of performing the online banking operation, further comprises: categorizing the collected identification data into one or more data categories; determining a first numerical coefficient of security of each data category; determining a second numerical coefficient of data security in each category based on the volume of collected data in a given category; and computing the level of security of performing the banking operation as a mathematical function of the plurality of first and second coefficients.

In one exemplary aspect, the categories of collected identification data include one or more of: a category of the data containing elements of malicious software; a category of the data containing results of the working of malicious software; a category of the data containing elements of software running on the user device and necessary for the working of the malicious software; a category of the data containing elements of legitimate software; and a category of the data containing results of the working of the legitimate software.

In one exemplary aspect, determining whether to perform the banking operation is based on detecting that: the level of security is not lower than a threshold value, or in the event of performing several banking operations, a measure of central tendency of levels of security of performing the several banking operations is not lower than the threshold value.

In one exemplary aspect, a system for performing secure online banking transactions, comprises a hardware processor of a user device configured to: collect data related to at least one transaction of the online banking operation requested by a user device; create a plurality of verification scripts based at least on the collected data, wherein each verification script comprising at least one rule requiring collection of one or more types of identification data associated with the transaction of the banking operation, and wherein different verification scripts comprises different rules for collecting different types of identification data associated with the transaction of the banking operation; execute the plurality of verification scripts to collect the required identification data; determine a level of security of performing the banking operation based at least on the identification data collected by the plurality of verification scripts; and determine whether to perform or not to perform the requested banking operation based on the determined level of security.

In one exemplary aspect, a non-transitory computer readable medium storing thereon computer executable instructions for performing secure online banking transactions includes instructions for: collecting data related to at least one transaction of the online banking operation requested by a user device; creating a plurality of verification scripts based at least on the collected data, wherein each verification script comprising at least one rule requiring collection of one or more types of identification data associated with the transaction of the banking operation, and wherein different verification scripts comprises different rules for collecting different types of identification data associated with the transaction of the banking operation; executing the plurality of verification scripts to collect the required identification data; determining a level of security of performing the banking operation based at least on the identification data collected by the plurality of verification scripts; and determining whether to perform or not to perform the requested banking operation based on the determined level of security.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects on the invention are described herein in the context of a system, method and computer program product for performing secure online banking transactions. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used in describing example aspect of the invention:

A banking operation may be an operation with data associated with a bank account of a user. The banking operation may involve one or more electronic transactions between a computing device of the user and Internet banking system.

A banking transaction may be an operation with a bank account, performed on the part of the bank using provided data. One distinguishes online transactions, performed in real time between all interested parties, and offline transactions. As the final part of a banking operation, the transaction may be initiated by an electronic order through Internet banking systems or other communication systems, and also by means of any given payment instrument.

Figure 1:
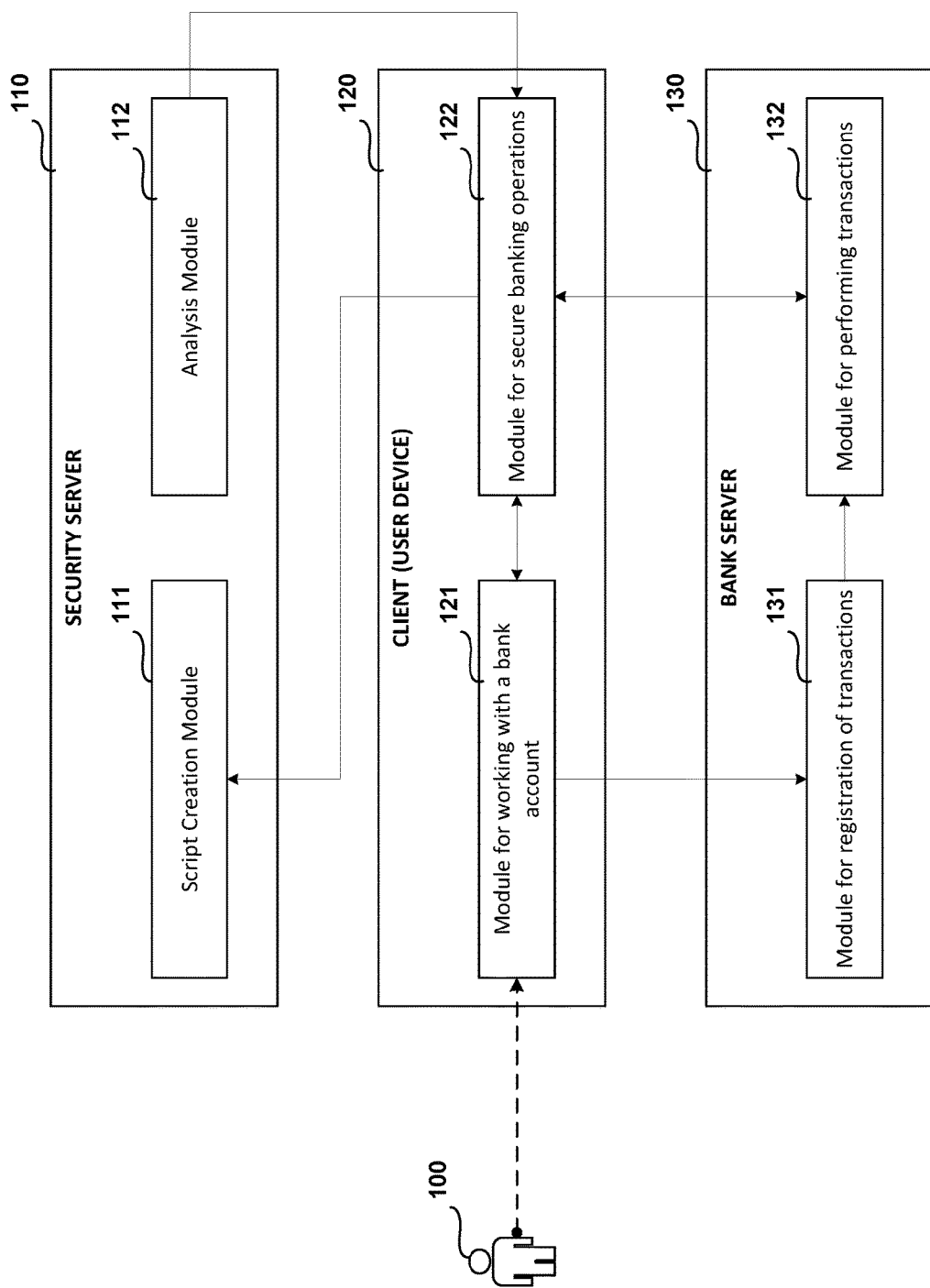
FIG. 1 presents a diagram of an exemplary system for performing secure online banking transactions according to aspects of the invention.

FIG. 1 shows an exemplary system for performing secure online banking transactions according to aspects of the invention. The system may include, but not limited to, a security server 110, a script creation module 111, an analysis module 112, a client 120, a module for working with a bank account 121, a module for secure banking operations 122, a bank server 130, a module for registering banking transactions 131, and a module for performing banking transactions 132.

The client 120, working on a computing device (also referred herein below as a "user device"), may be configured to collect from that computing device the data needed to perform the banking operation. In one exemplary aspect, the 120 client includes the module for working with a bank account 121 and the module for secure banking operations 122. The client 120 may be, but not limited to: an application or group of applications interacting with each other and running on the computing device of the user 100; a site launched on a browser running on the computing device of the user 100; or other possible variants of a connection being implemented from the computing device of the user 100 with the bank server 130. In one exemplary aspect, the client may include an Internet banking application, a bundle of a passwords manager application and an Internet banking application (in this case the user 100 may not transmit authorization data to the online banking application, but rather that data may be obtained directly by the online banking application from the passwords manager application), and so on.

In one exemplary aspect, the module for working with a bank account 121 may be configured to: obtain from the user device data describing the banking operation which needs to be performed (hereinafter, operating information); and transmit the operating information to the module for registering transactions 131 and to the script creation module 111.

The collecting of operating information may be done at least: using a separately installed application with administrative rights (data may be sent between the mentioned application and the module for working with a bank account 121 with the use of interprocess communication means); directly by the module for working with a bank account 121 itself (for example, if the access rights of that means have been elevated to the level needed for access to the operating information); and using at least one of: the available API functions of the graphic interface with which the user 100 is entering the data; the available API functions of the operating system (for example, in the operating systems of the Windows family with the help of the function "::GetWindowsText"); the intercepting of system events; or direct access to the memory of the processes working with data entered by the user 100.

The operating information may contain, but not limited to: authorization data for access to the bank account, the personal account, and so on (for example, login and password, biometric data of the user 100, such as fingerprint, iris photograph, voice patterns, handwriting specimens, and so on); banking particulars; types of banking operations being requested (for example, obtaining of account balance, transfer of a sum of money from one account to another, account deposit, funds withdrawal, payments for goods and services, and so on); the sums of money involved in the banking operations being requested; data confirming completion of the banking operation (for example, confirmation codes of the banking operation with the use of the 3ds-secure technology); supplemental information relating to the banking operations being requested (for example, commentaries for the operations performed) or to the modification of the account of the user 100 (for example, the account numbers with which the user 100 is working).

In another exemplary aspect, the module for working with a bank account 121 may provide the user 100 with a graphic interface by means of which the user 100 may enter all necessary data describing the banking operation.

In yet another exemplary aspect, the module for working with a bank account 121 may collect some of the data describing the banking operation (such as the banking particulars) not from the actual user 100, but from a computer network (such as the Internet or the network of the bank server) on the basis of previously collected information (such as credit card number). For example, the user 100 via the interface provided by the module for working with a bank account 121 may indicate, as the account to which he wishes to transfer a certain sum of money, "checking account of an environmental protection society", while the checking account of the environmental protection society may be nowhere present in the system of performing a banking transaction and may not be known to the module for working with a bank account. After the module for working with a bank account 121 has collected the text data "checking account of an environmental protection society", it may perform a search on the Internet for the banking particulars of the environmental protection society. If the search is successful, the banking particulars found may be used as one of the characteristics of the banking operation.

In one exemplary aspect, the module for secure banking operations 122 may be configured to: collect from the user device identification data obtained as a result of executing the verification script obtained from the script creation module 111, wherein the verification script may contain at least one data collection rule, where the data collection rule may determine the characteristics of the identification data by which the module for secure banking operations 122 unambiguously determines the identification data among other data of the computing device of the user 100, the methods of gathering the identification data on the basis of which the module for secure banking operations 122 selects the resources of the computing device of the user 100 which will be used for collected the identification data, the conditions of collected the identification data upon the fulfillments of which conditions the module for secure banking operations 122 will perform the collecting of the identification data. The module 122 may then transmit the collected identification data to the analysis module 112.

In one exemplary aspect, each verification script may include one or more rules specifying collection of different types of identification data associated with the transaction of the banking operation. Thus, different verification scripts may include different data collection rules for collecting different types of identification data. The use of multiple verification scripts that rely on different types of identification data improve accuracy of determining whether the user 100 is in fact authorized to perform the desired banking transaction.

In various exemplary aspect, the different types of identification data may include, but not limited to:

the dump of the RAM of the user device;

the logs of network activity of the applications running on the user device (containing records which include the unique application identifier, the time for the start and end of the data exchange in the computer network, the network address of the server with which data is exchanged, the volume of data being transmitted or received, and so forth);

the logs of function calls from applications running on the user device (containing records which include the unique application identifier, the time of calling the function, the name of the function, the data being transmitted to the function, the result of the working of the function called, and so forth);

the security policies running on the computing device of the user 100;

the data being transmitted between applications running on the user device, as well as the methods of transmitting said data, such as unique identifiers of the applications participating in the data exchange, the start and end time of the data exchange, the volume and type of data being transmitted, the type of InterProcess Communication (IPC) and so forth;

the characteristics of the applications running on the user device (the volume of RAM occupied by the working application, the time of its operation, the unique identifier of the application, such as the check sum MD5 of the application or the name under which the application is registered in the operating system of the user device, and so on).

The characteristics of the identification data may include but not limited to: the data type of the identification data (for example, number, string, array of bytes, image, media-data, and so forth), the size of the identification data, and the location of the identification data (for example, the pointer in the RAM, the path on the hard drive, and so forth).

The methods of collecting the identification data may include but not limited to: the use of API function calls of the graphic interface with which the user 100 enters the data; the use of API function calls of the operating system; the intercepting of system events; direct access to the memory of the processes working with data entered by the user 100.

The resources of the computing device of the user 100 may include but not limited to: the API functions of the graphic interface with which the user 100 is entering the data; the API functions of the operating system; the system events; the data for obtaining access to the information media (memory, external information media, hard drives, and so forth).

In one exemplary aspect, the module for secure 122 may perform the following operations with the collected data: encrypt the collected identification data; archive the collected identification data; compute the convolutions of the collected identification data; compute the check sums from the collected identification data (such as CRC32 or MD5).

The module for secure 122 may send the results of the performing of the aforesaid operations to the analysis module 112. In one exemplary aspect, for economy of network traffic and thus reduced work time, the module for secure 122 instead of sending the collected identification information to the analysis module 112 will send the computed check sums (such as MD5) calculated from the collected identification data.

In one exemplary aspect, the security server 110 may be configured to analyze the level of security of the banking operation from the computing device, wherein the security server may contain the script creation module 111 and the analysis module 112.

In another exemplary aspect, the security server 110 and the bank server 130 may include a single server running on the bank side and containing the script creation module 111, the analysis module 112, the module for registering transactions 131, and the module for performing transactions 132.

Such an architecture may ensure a high speed of performing banking transactions due to reducing the consumption of computing and network resources (such as network traffic between the security server 110 and the bank server 130 and so forth). In one exemplary aspect, the security server 110 and the bank server 130 may include two separate servers located in different parts of the world, maintained and developed by different groups of people. Such an architecture may be able to increase the security of performing the banking transactions through making malware penetration of the aforementioned servers and subsequent compromising of the operation of those servers in performing the banking transactions more difficult.

In one exemplary aspect, the script creation module 111, the analysis module 112, the module for registering transactions 131, and the module for performing transactions are not accessible to the client 120, but only the bank server 130 with which the client 120 may be performing the data exchange is accessible. The bank server 130 in this case may include a distributed system, in which the mentioned modules are physically separated (for example, they are present on different servers in different parts of the world). When it is necessary to address one of the modules of the security server 110, the client 120 will also address the bank server 130.

In another exemplary aspect, when the security server 110 and the bank server 130 are logically separated and different for the client 120, the client may have the ability to select from among the different security servers (for example, the user himself 100 can select which provider of security services containing one of the available security servers to work with, and designate this as his current security server 110).

The level of security of performing a banking operation may be a numerical value characterizing the probability of occurrence of unauthorized access to the aforementioned operating information. In one exemplary aspect, the level of security of performing a banking operation may be a numerical value from 0 to 1, where 0 may indicate that unauthorized access to the aforementioned operating information being transmitted from the module for secure banking operations 122 to the module for performing transactions 131 is guaranteed to occur, while 1 means that unauthorized access to the aforementioned operating information is guaranteed to be absent. In another aspect, the level of security of performing a banking operation may be a discrete quantity taking on a limited set of values (for example, 0—performing the banking operation is dangerous, 1—performing the banking operation is not recommended, 2—performing the banking operation is safe) and so forth.

In another exemplary aspect, the script creation module 111 may be configured to create a verification script on the basis of the operating information obtained from the module for working with a bank account 121, wherein the verification script may be configured to collect identification data and contains at least one data collection rule, which may determine the characteristics of the identification data by which the module for secure banking operations 122 unambiguously determines the identification data from among other data of the computing device of the user 100, the methods of gathering the identification data on the basis of which the module for secure banking operations 122 may select the resources of the computing device of the user 100 which will be used for gathering the identification data, the conditions of gathering the identification data upon the fulfillment of which conditions the module for secure banking operations 122 performs the collection of the identification data; the characteristics, the conditions and the methods of gathering the identification data may be chosen such that the level of security of performing the banking operation may be calculated on the basis of an analysis of the collected data. The script creation module 111 sends the created verification script to the module for secure banking operations 122.

In one exemplary aspect, the verification script may contain: the set of previously created data collection rules; the ways of applying the collection rules (for example, the order of execution of the collection rules by the module for secure banking operations 122); the ways of obtaining supplemental data as a result of processing of the collected data, such as: calculation of check sums from the obtained data; searching for data obtained as a result of the working of one data collection rule among the data obtained as a result of the working of another data collection rule; searching for relationships between the obtained data and calculating of numerical coefficients describing the relationships found.

In one exemplary aspect, the verification script may be created using one of the existing scripting languages (such as LUA, AppleScript and so forth). The benefit of this approach may include the speed of execution of the creation of the verification, the support, and the transparency of operation.

In another exemplary aspect, the verification script may be created using a high-level programming language (such as Java, C++ and so forth). The benefit of this approach may include the reliability of the working of the verification script, and the difficulty or even impossibility of its analysis by malicious means.

In another exemplary aspect, the data collection rules making up the verification script may be selected from a set of predetermined rules as follows:

1) each data collection rule from the mentioned set of data collection rules is matched up with a numerical coefficient, characterizing the probability that the execution of the mentioned data collection rule on the computing device of the user 100 will result in the obtained data containing information about the possibility of occurrence of unauthorized access to the operating information;
2) the numerical coefficient for each data collection rule may depend on the type, the volume, and so forth of the operating information which the said data collection rules are intended to produce;
3) the numerical coefficients may be calculated in advance on the basis of a statistical analysis of previously gathered data from other computing devices;
4) from said set of data collection rules, data collection rules may be selected randomly until such time as the cumulative probability of detecting an unauthorized access to the operating information surpasses a predetermined threshold value.

In another exemplary aspect, the data collection rules may not be selected from a predetermined set of data collection rules, but rather created each time anew with the use of at least: artificial neural networks, for analysis of previously created data collection rules and creating new data collection rules on this basis and on the basis of the identification data obtained; statistical classification algorithms; or statistical forecasting algorithms.

The analysis module 112 may be configured to: calculate on the basis of the identification data obtained from the module for secure banking operations 122 the level of security of performing the aforementioned banking operation; and request performing the banking operation from the module for performing transactions 132 in the event that the calculated level of security of performing said banking operation satisfies a predetermined threshold value.

The fulfillment of the condition of satisfying a predetermined threshold value may include at least the following: the calculated level of security of performing the banking operation is not lower than the predetermined threshold value; and in the event of performing several banking operations, the measure of central tendency of the calculated levels of security of performing the banking operations is not lower than the predetermined threshold value.

In one exemplary aspect, the level of security of performing a banking operation may be calculated in the following manner:

The condition of influence on the security of performing the banking operation may involve a malicious software running on the computing device of the user 100 and modifying the operating information being transmitted to the bank server 130.

1) the obtained identification data may be categorized in at least the following categories:
   the data contain elements of malicious software;
   the data contain results of the working of malicious software;
   the data contain elements of software running on the computing device and necessary for the working of the malicious software (such as software vulnerabilities);
   the data contain elements of legitimate software;
   the data contain results of the working of legitimate software;
2) each category is matched up with a numerical coefficient of security of the category, characterizing how the data categorized in the mentioned category influence the security of performing the banking operation, and taking on a value from 0 (the data are elements of malicious software) to 1 (the data are elements of trusted software);
3) for each category, a coefficient of data security may be calculated, depending on the volume of identification data categorized in the given category, wherein the coefficient of data security may take on a value from 0 (in the event that there is no identification data at all in the category) to 1 (in the event that all the identification data obtained from the module for secure banking operations 122 has been categorized in the given category);
4) the level of security of performing the banking operation is computed according to the formula $$L = \Sigma C_i \times N_i(p_i)$$

where:
  L—level of security of performing the banking operation,
  $C_i$—coefficient of security of the category i,
  $N_i(p_i)$—coefficient of data security, depending on the volume of data in category i.

The bank server 130 may be configured to perform a banking operation on the basis of the data transmitted by the client 120, while the bank server 130 contains the module for registering transactions 131, and the module for performing transactions 132.

In one exemplary aspect, the module for registering transactions 131 may be configured to: create, on the basis of the operating information obtained from the module for working with a bank account 122, the operating information of the banking transaction of the banking operation; and transmit the created transaction to the module for performing transactions 132. The created banking transaction may be transmitted to the module for performing transactions 132: upon expiration of a previously established period of time, or upon receiving a command from the analysis module 112.

In one exemplary aspect, after creating the banking transaction, it is saved in a database, residing in the bank server 130. If upon expiration of a previously established period of time (for example, by the administrators of the bank server 130 on the basis of a statistical analysis of the security of previously performed banking operations) no command to perform the mentioned banking transaction has arrived from the analysis module 112, it is removed from the database and thus cannot be performed even after arrival of the mentioned command from the analysis module 112.

In another exemplary aspect, the mentioned set period of time may depend on the operating information obtained from the module for working with a bank account 122—for more critical banking operations (involving the transfer of monetary funds) the set period of time is shorter, for less critical banking operations (involving the modification of data about the bank account) the set period of time is longer.

The module for performing transactions 132 may be configured to perform, on the request of the analysis module 112, a banking transaction previously created by the module for registering transactions 131.

The results of performing the banking transaction may be sent to the client 120 to inform the user 100 about the results of performing the mentioned banking operation.

In one exemplary aspect, the user 100 may, through the module for working with a bank account 121, cancel or modify the mentioned banking operation and, as a consequence, the banking transaction. For example, if the user 100 attempts to perform one after the other the banking operations: transfer a sum of money from account #1 to account #2, cancel the previous banking operation, or obtain the status of account #1, then in the event that banking operation #1 has already been registered, but not yet performed, banking operation #1 is replaced on the bank server 130 by banking operation #3. Thus, the workload may be reduced on the bank server 130, and the security of the banking operations performed may also be increased.

Let's consider the system of performing a banking transaction on the example of carrying out a bank transfer of $100 from account #1 (bank card) to account #2 (checking account), being carried out by the user 100 with the use of an online banking computing application BankingApp, running on a smartphone. The mentioned computing application BankingApp in this case contains a malicious functionality, making it possible to transmit data related to bank accounts and banking operations to hackers. The described situation was made possible because the user 100 installed BankingApp not from the official bank site, but from an untrusted site disseminating modified online banking applications.

The user 100 may launch an online banking application BankingApp 120, running on a smartphone, to perform the above-described banking operation. For this purpose, the user 100 may send to the application BankingApp 120 the data needed to perform the mentioned banking operation via the interface provided:

- the login and password for access to the personal account 100;
- the banking particulars (name of the bank, network addresses of the banking services with which the data exchange will occur, and so on);
- the number and type of account #1, from which $100 needs to be withdrawn: bank card 0001-0002-0003-0004;
- the number and type of account #2, to which $100 needs to be added: checking account 10101010000001000001;
- the amount and currency of the money transfer: $100;
- comments on the banking operation being requested: "payment for web designer services";
- the confirmation code of the banking operation, obtained from the bank via text message: "9876".

After the user 100 sent all necessary data to the application BankingApp 120, one of the modules of that application, specifically the module for working with a bank account 121, gathers the data transmitted by the user 100 and processes it: encrypts by an asymmetrical encryption algorithm using a public key, thus further protecting the data being transmitted by public computer networks, verifies the gathered data for adherence to proper format (correctness of account numbers, sums of money, and so forth); calculating the identification data, and transmits it to the predetermined network address of the bank server 130.

Moreover, the module for working with a bank account 121 also transmits the obtained identification data to another module of BankingApp 120, specifically, to the module for secure banking operations 122. This module is an external library, provided to the developers of the online banking application BankingApp 120 by a third party, for secure banking operations and approved by the bank. The module for secure banking operations 122 analyzes the identification data obtained from the module for working with a bank account 121 in order to determine which of the received identification data characterizes the banking operation being requested and might be used in hacker schemes, such as: unauthorized access to the personal account of the user 100; unauthorized banking operations; obtaining confidential information of the user 100 (such as a list of banking operations performed).

In the example being described, that data may comprise: the login and password for access to the personal account of the user 100; the banking particulars (name of the bank, network addresses of the banking services with which the data exchange will occur, and so on); the numbers of the accounts used in the described banking operation; the amount of the money transfer; the type of banking operation being requested: money transfer.

The module for secure banking operations 122 may be configured to use an asymmetrical encryption algorithm with a public key to encrypt the selected data and sends said data to the predetermined network address of the security server 110.

On the security server 110 the identification data sent by the module for secure banking operations 122 is sent to the script creation module 111. The script creation module 111 for each type of data from the received identification data (such as the data describing the login and password for access to the personal account, for the banking operation "bank transfer", and so on) selects rules for the gathering of data from the computing device of the user so that, if malicious software is operating on the computing device of the user, that malicious software is reliably identified. For example, in order to determine that malicious software is running on the computing device and obtaining unauthorized access to the authorization data of the user, it is necessary to obtain the call log of functions occurring after the authorization data was entered by the user 100. After the data collection rules have been selected, the characteristics of execution of the data collection rules are determined. After this, a verification script may be formulated from the selected data collection rules and sent to the module for secure banking operations 122.

The module for ensuring of banking operations 122 after having obtained the verification script will execute it.

The data characterizing the banking operation and sent to the bank server 130 by the module for working with a bank account 121 is received by the module for registering transactions 131. The received data may be processed: if the data has been encrypted, it is decrypted (for example, by an asymmetrical encryption algorithm using a private key); the login, password, and confirmation code of the performing of the banking operation are verified for adherence to proper format; on the basis of the received banking particulars, account numbers, and so forth, the technical possibility of performing the required banking operation is verified (accounts #1 and #2 exist, there is $100 in account #1 and so forth); after which, in event of a successful processing, a banking transaction is created on the basis of the data, which transaction is registered and stored in the banking system. A time period is set for the registered banking transaction during which that banking transaction can be performed, and upon expiration of which it will be removed from the banking system, and the online banking application BankingApp 120 will be sent information by the module for registering transactions 131 as to an unsuccessful attempt to perform that banking operation. Thus, additional protection against unauthorized access to the data of the mentioned banking operation is realized. Otherwise, the online banking application BankingApp 120 will be issued information by the module for registering transactions 131 as to the denial of performing the requested banking operation, which will afterwards be presented to the user 100 in a convenient form for his perusal.

Data on the allowing of performing the mentioned banking operation, sent to the bank server 130 by the analysis module 112, is received by the module for performing transactions 132. On the basis of the received data, the module for performing transactions 132 conducts a search for the aforementioned banking transaction registered in the banking system. If the banking transaction is found, it is performed, and the results of the performing are sent to the online banking application BankingApp 120, which results are afterwards presented to the user 100 in a convenient form for his perusal.

Figure 2:
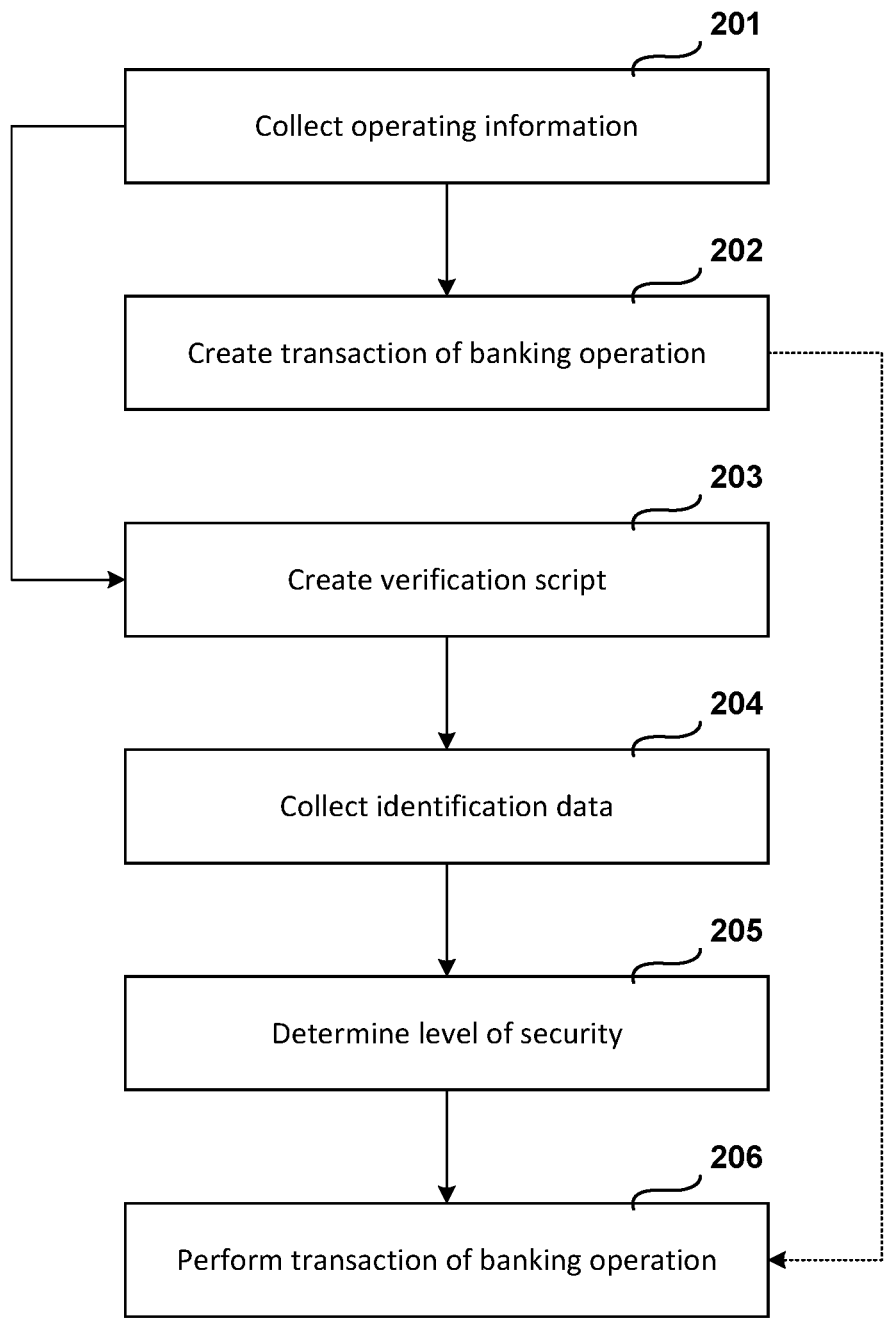
FIG. 2 presents a flow diagram of an exemplary method for performing secure online banking transactions according to aspects of the invention.

FIG. 2 shows an exemplary method for performing secure online banking transactions according to aspects of the invention. The method includes a step 201, in which operational information is gathered, a step 202, in which the transaction of the banking operation is created, a step 203, in which a verification script is created, a step 204, in which identification data is gathered, a step 205, in which the level of security of performing the banking operation is calculated, and a step 206, in which the transaction of the banking operation is performed.

More specifically, in step 201, data describing the requested banking operation (hereinafter, operational information) is gathered from the mentioned computing device.

The operating information may include, but not limited to: authorization data for access to the bank account, the personal account, and so on (login and password, biometric data of the user 100, such as fingerprint, iris photograph, voice patterns, handwriting specimens, and so on); banking particulars; types of banking operations being requested (obtaining of account balance, transfer of a sum of money from one account to another, account deposit, funds withdrawal, payments for goods and services, and so on); the sums of money involved in the banking operations being requested; data confirming performing the banking operation (confirmation codes of the banking operation with the use of the 3ds-secure technology and so forth); supplemental information relating to the banking operations being requested (comments for the operations performed and so forth) or to the modification of the account of the user 100 (for example, the account numbers with which the user 100 is working).

In step 202, the transaction of the mentioned banking operation is created on the basis of the operating information obtained in step 201. It is possible for step 206 to be executed upon expiration of a previously established period of time or upon receiving a command from the analysis module 112 in step 205.

In step 203, the verification script may be created on the basis of the operating information gathered in step 201, the verification script being configured to collect data (hereinafter, identification data) from the aforesaid computing device and contain at least one data collection rule. The rule may define the characteristics of the identification data according to which the identification data is unambiguously determined in step 204 among other data of the computing device of the user 100, the methods of gathering the identification data on the basis of which the resources of the computing device of the user 100 which will be used for gathering the identification data are selected in step 204, the conditions of gathering the identification data upon the fulfillment of which conditions the gathering of the identification data will be done in step 204, while the characteristics, the conditions and the methods of gathering the identification data are chosen such that the level of security of performing the banking operation is calculated on the basis of an analysis of the gathered identification data. The level of security of performing the banking operation may be a numerical value from 0 to 1, characterizing the probability of there being unauthorized access to the mentioned operating information.

The verification script may contain: the set of previously created data collection rules, the ways of applying the data collection rules (for example, the order of execution of the data collection rules in step 204), the ways of obtaining supplemental data as a result of processing of the data obtained as a result of the working of the data collection rules, such as: calculation of check sums from the obtained data; searching for data obtained as a result of the working of one data collection rule among the data obtained as a result of the working of another data collection rule; or searching for relationships between the obtained data and calculating of numerical coefficients describing the relationships found.

In one exemplary aspect, the verification script may be created using one of the existing scripting languages, such as LUA, AppleScript and so forth. The benefit of this approach is the speed of execution of the creation of the verification, the support, and the transparency of operation.

In another exemplary aspect, the verification script can be created using a high-level programming language (such as Java, C++ and so forth). The benefit of this approach is the reliability of the working of the verification script, and the difficulty or even impossibility of its analysis by malicious means.

In step 204, identification data is gathered resulting from execution of the verification script created in step 203, the verification script containing at least one data collection rule, where the data collection rule describes the characteristics of the identification data by which the identification data is unambiguously identified in step 204 among other data of the computing device of the user 100, the methods of gathering the identification data on the basis of which the resources of the computing device of the user 100 which will be used for gathering the identification data are selected in step 204, and the conditions of gathering the identification data upon the fulfillment of which the identification data is collected in step 204.

The types of the identification data may include, but not limited to:
the dump of the RAM of the computing device;
the logs of network activity of the applications running on the computing device (containing records which include the unique application identifier, the time for the start and end of the data exchange in the computer network, the network address of the server with which data is exchanged, the volume of data being transmitted or received, and so forth);
the logs of function calls from applications running on the computing device (containing records which include the unique application identifier, the time of calling the function, the name of the function, the data being transmitted to the function, the result of the working of the function called, and so forth);
the security policies running on the computing device of the user 100;
the data being transmitted between applications running on the computing device, as well as the methods of transmitting said data, such as unique identifiers of the applications participating in the data exchange, the start and end time of the data exchange, the volume and type of data being transmitted, the type of InterProcess Communication (IPC) and so forth;

the characteristics of the applications running on the computing device (the volume of RAM occupied by the working application, the time of its operation, the unique identifier of the application, such as the check sum MD5 of the application or the name under which the application is registered in the operating system of the computing device, and so on).

The characteristics of the identification data may include: the data type of the identification data (for example, number, string, array of bytes, image, media-data, and so forth), the size of the identification data, and the location of the identification data (for example, the pointer in the RAM, the path on the hard drive, and so forth).

The methods of collecting the identification data may include: the use of API function calls of the graphic interface with which the user 100 enters the data; the use of API function calls of the operating system; the intercepting of system events; direct access to the memory of the processes working with data entered by the user 100.

The resources of the computing device of the user 100 may include: the API functions of the graphic interface with which the user 100 enters the data; the API functions of the operating system; the system events; the data for obtaining access to the information media (memory, external information media, hard drives, and so forth).

During step 204, the following operations can be performed with the collected identification data: encrypting the collected identification data; archiving the collected identification data; computing the convolutions of the collected identification data; or computing the check sums from the collected identification data (such as CRC32 or MD5); and the results of performing the mentioned operations will be further processed in step 205.

In step 205, the level of security of performing the mentioned banking operation is calculated on the basis of the identification data collected in step 204.

In step 206, the transaction created in step 202 is performed in the event that the level of security of performing the mentioned banking operation as calculated in step 205 satisfies a predetermined threshold value.

The fulfillment of the condition of satisfying a predetermined threshold value may consist in at least the following: the calculated level of security of performing the banking operation is not lower than the predetermined threshold value; or in the event of performing several banking operations, the measure of central tendency of the calculated levels of security of performing the banking operations is not lower than the predetermined threshold value.

The results of performing the banking transaction may be sent to the client 120 for information of the user 100 about the results of performing the mentioned banking operation.

Figure 3:
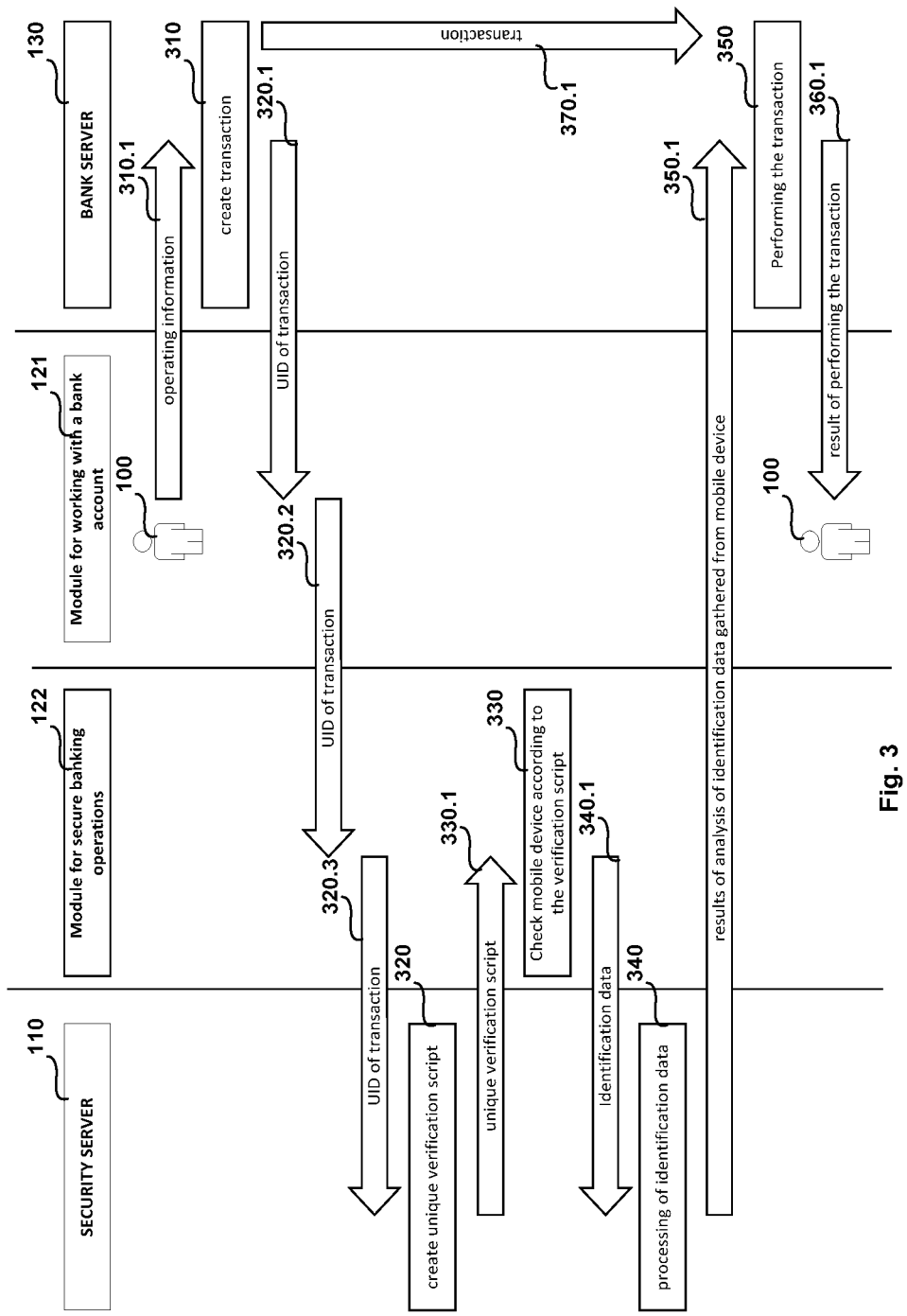
FIG. 3 presents another diagram of the sequence of steps of an exemplary method for performing secure online banking transactions according to aspects of the invention.

FIG. 3 shows a sequence of steps of an exemplary method for performing secure online banking transactions according to aspects of the invention, involving the user 100, a security server 110, a module for working with a bank account 121, a module for secure banking operations 122, a bank server 130, and in which: a transaction 310 is created, a unique verification script 320 is created, the computing device of the user is verified according to a verification script 330, identification data 340 is processed and the transaction 350 is performed, and data transmitted between the means, namely: operating information 310.1, the UID of the transaction 320.1, 320.2, 320.3, the unique verification script 330.1, identification data 340.1, results of the analysis of the identification data collected from the computing device 350.1, results of performing the transaction 360.1, and the banking transaction 370.1.

More specifically, the user 100 via a graphic interface, provided by the client 120, sends the data characterizing the banking operation to the module for working with a bank account 110. From the data sent by the user 100, the module for working with a bank account formulates the operating information 310.1 and sends it to the bank server 130. The bank server 130 processes the operating information 310.1 received from the module for working with a bank account 121 and creates the banking transaction 370.1, which is unambiguously associated with a unique identifier (UID of the transaction) 320.1. The bank server returns the UID of the transaction to the module for working with a bank account 121, to which it is connected. The module for working with a bank account 121 will send the UID of the transaction obtained from the bank server 130 to the module for secure banking operations 122. The module for secure banking operations 122 establishes a connection with a predetermined security server 110 and sends to it the UID of the transaction 320.3 received from the module for working with a bank account 121. Besides the actual UID of the transaction 320.3, the module for secure banking operations 122 may also send the operating information 310.1, previously received by the means of working with a bank account (on the basis of this information, the security server 110 will create the unique verification script 330.1). The security server 110 creates the unique verification script 330.1 and sends it back to the module for secure banking operations 122. The module for secure banking operations 122 performs the received unique verification script 330.1, which may collect the identification data 340.1 from the computing device of the user 100. After this, the module for secure banking operations 122 sends the collected identification data 340.1 to the security server 110. The security server processes the received identification data 340.1: from the collected identification data 340.1 it calculates whether it will be safe to perform the banking transaction 370.1, whether unauthorized access was gained to the operating information 310.1, and so forth. After completing the execution of the verification, the security server 110 sends the results of the verification of the computing device 350.1, also containing the UID of the transaction previously received from the module for secure the banking operation 122, to the bank server 130. In the event that the results of the verification of the computing device of the user 100 are positive, the bank server 130 may perform the previously created banking transaction, and send the results of the execution of the banking transaction to the module for working with a bank account 121. In the event of a negative result of the verification of the computing device of the user 110, the bank server may block execution of the transaction.

Figure 4:
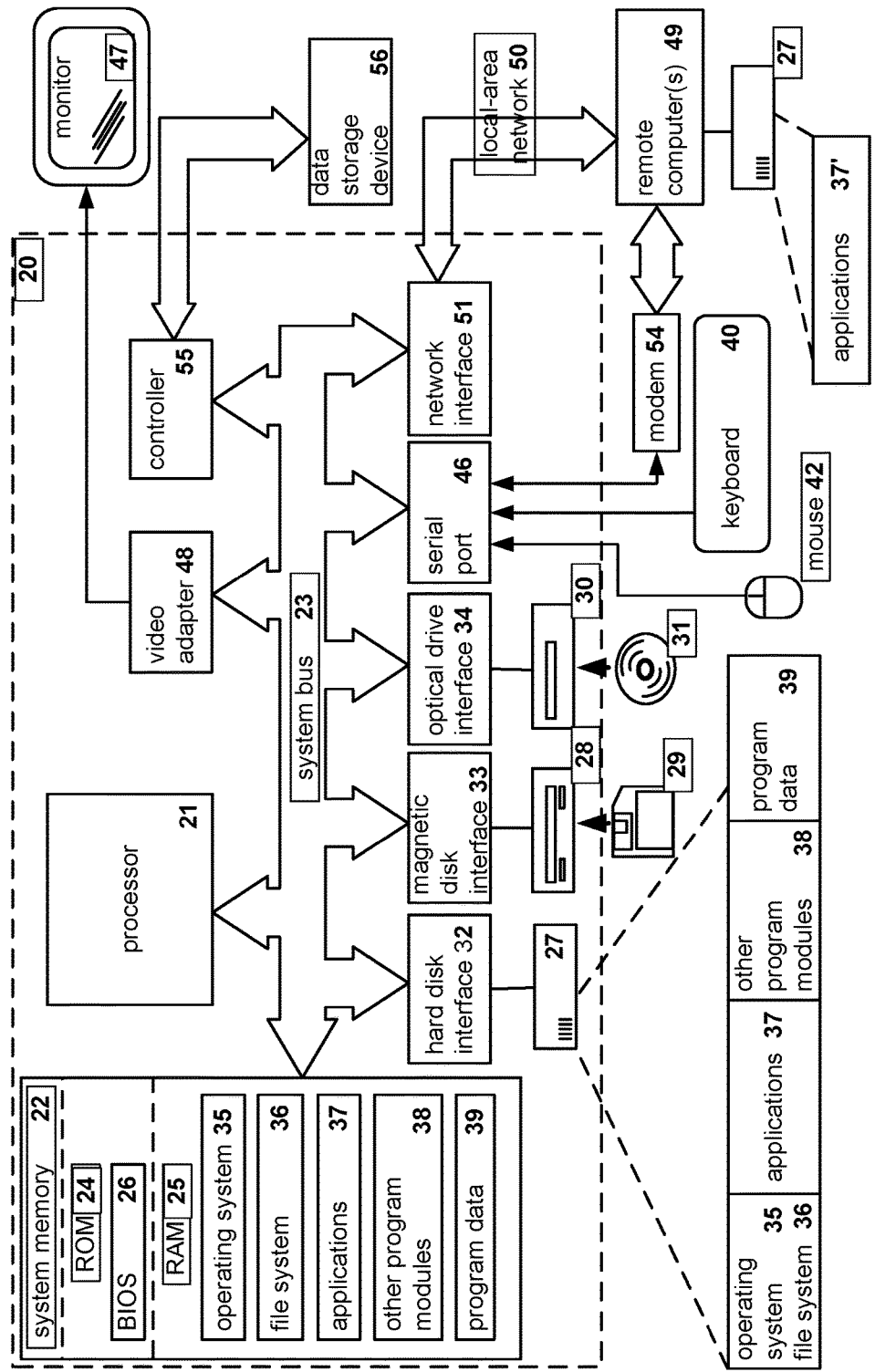
FIG. 4 shows an example of a general-purpose computer system on which the systems and methods for performing secure online banking transactions can be implemented.

FIG. 4 is a diagram illustrating a general-purpose computer system on which systems and methods for performing secure online banking transactions may be implemented in accordance with an exemplary aspect. As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, supra). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for performing a secure online banking operation, the method comprising:
   collecting, by a processor of a security server, data related to at least one transaction of the online banking operation requested by a user device to a banking server, wherein the banking server is directly accessible to the user device;
   creating, by the processor, a plurality of verification scripts based at least on the collected data, wherein each verification script comprising at least one rule requiring collection of one or more types of identification data associated with the transaction of the banking operation;
   collecting the identification data from the user device that executed the plurality of verification scripts, wherein the collected identification data comprises logs of network activities of applications running on the user device and logs of function calls from applications running on the user device;
   determining, by the processor, a level of security of performing the banking operation based at least on the identification data collected by the plurality of verification scripts; and
   determining, by the processor, whether to perform or not to perform the requested banking operation based on the determined level of security.

2. The method of claim 1, wherein the data related to at least one transaction of the online banking operation comprises at least one of the following:
   authorization data for accessing a bank account;
   information relating to a type of the banking operation being requested;
   a sum of money involved in the banking operation being requested;
   data confirming performing the banking operation; and
   supplemental information relating to the banking operation being requested or to modifications of the bank account.

3. The method of claim 1, wherein the verification script includes at least one of:
   one or more rules for collecting the identification data;
   one or more methods for collecting the identification data; and
   one or more conditions for collecting the identification data.

4. The method of claim 1, wherein the identification data further comprise at least one of:
   a dump of an RAM of the user device; and
   characteristics of applications running on the user device, wherein the characteristics comprise at least one of a volume of memory occupied by the running applications, a time of operation of the running applications, and unique identifiers of the running applications.

5. The method of claim 1, wherein executing the verification script to collect the identification data comprises at least one of:
   encrypting the collected identification data;
   archiving the collected identification data;
   computing convolutions of the collected identification data; and
   computing check sums from the collected identification data.

6. The method of claim 1, wherein determining a level of security of performing the online banking operation, further comprises:
   categorizing the collected identification data into one or more data categories;
   determining a first numerical coefficient of security of each data category;
   determining a second numerical coefficient of data security in each category based on the volume of collected data in a given category; and
   computing the level of security of performing the banking operation as a mathematical function of the plurality of first and second coefficients.

7. The method of claim 6, wherein the categories of collected identification data include one or more of:
   a category of the data containing elements of malicious software;
   a category of the data containing results of the working of malicious software;
   a category of the data containing elements of software running on the user device and necessary for the working of the malicious software;
   a category of the data containing elements of legitimate software; and
   a category of the data containing results of the working of the legitimate software.

8. The method of claim 1, wherein determining whether to perform the banking operation is based on detecting that: the level of security is not lower than a threshold value, or in the event of performing several banking operations, a measure of central tendency of levels of security of performing the several banking operations is not lower than the threshold value.

9. A system for performing a secure online banking operation, the system comprising:
   a hardware processor of a security server configured to:
      collect data related to at least one transaction of the online banking operation requested by a user device to a banking server, wherein the banking server is directly accessible to the user device;
      create a plurality of verification scripts based at least on the collected data, wherein each verification script comprising at least one rule requiring collection of one or more types of identification data associated with the transaction of the banking operation;
      collect the identification data from the user device that executed the plurality of verification scripts, wherein the collected identification data comprises logs of network activities of applications running on the user device and logs of function calls from applications running on the user device;
      determine a level of security of performing the banking operation based at least on the identification data collected by the plurality of verification scripts; and
      determine whether to perform or not to perform the requested banking operation based on the determined level of security.

10. The system of claim 9, wherein the data related to at least one transaction of the online banking operation comprises at least one of the following:
   authorization data for accessing a bank account;
   information relating to a type of the banking operation being requested;
   a sum of money involved in the banking operation being requested;
   data confirming performing the banking operation; and
   supplemental information relating to the banking operation being requested or to modifications of the bank account.

11. The system of claim 9, wherein the verification script includes at least one of:
one or more rules for collecting the identification data;
one or more methods for collecting the identification data; and
one or more conditions for collecting the identification data.

12. The system of claim 9, wherein the identification data comprise at least one of:
a dump of an RAM of the user device;
characteristics of applications running on the user device, wherein the characteristics comprise at least one of a volume of memory occupied by the running applications, a time of operation of the running applications, and unique identifiers of the running applications.

13. The system of claim 9, wherein executing the verification script to collect the identification data comprises at least one of:
encrypting the collected identification data;
archiving the collected identification data;
computing convolutions of the collected identification data; and
computing check sums from the collected identification data.

14. The system of claim 9, wherein determining a level of security of performing the online banking operation, further comprises:
categorizing the collected identification data into one or more data categories;
determining a first numerical coefficient of security of each data category;
determining a second numerical coefficient of data security in each category based on the volume of collected data in a given category; and
computing the level of security of performing the banking operation as a mathematical function of the plurality of first and second coefficients.

15. The system of claim 14, wherein the categories of collected identification data include one or more of:
a category of the data containing elements of malicious software;
a category of the data containing results of the working of malicious software;
a category of the data containing elements of software running on the user device and necessary for the working of the malicious software;
a category of the data containing elements of legitimate software; and
a category of the data containing results of the working of the legitimate software.

16. The system of claim 9, wherein determining whether to perform the banking operation is based on detecting that: the level of security is not lower than a threshold value, or in the event of performing several banking operations, a measure of central tendency of levels of security of performing the several banking operations is not lower than the threshold value.

17. A non-transitory computer readable medium storing thereon computer executable instructions for performing a secure online banking operation, including instructions for:
collecting data related to at least one transaction of the online banking operation requested by a user device to a banking server, wherein the banking server is directly accessible to the user device;
creating a plurality of verification scripts based at least on the collected data, wherein each verification script comprising at least one rule requiring collection of one or more types of identification data associated with the transaction of the banking operation;
collecting the identification data from the user device that executed the plurality of verification scripts, wherein the collected identification data comprises logs of network activities of applications running on the user device and logs of function calls from applications running on the user device;
determining a level of security of performing the banking operation based at least on the identification data collected by the plurality of verification scripts; and
determining whether to perform or not to perform the requested banking operation based on the determined level of security.

18. The non-transitory computer readable medium of claim 17, wherein determining a level of security of performing the online banking operation, further comprises:
categorizing the collected identification data into one or more data categories;
determining a first numerical coefficient of security of each data category;
determining a second numerical coefficient of data security in each category based on the volume of collected data in a given category; and
computing the level of security of performing the banking operation as a mathematical function of the plurality of first and second coefficients.

19. The non-transitory computer readable medium of claim 18, wherein the categories of collected identification data include one or more of:
a category of the data containing elements of malicious software;
a category of the data containing results of the working of malicious software;
a category of the data containing elements of software running on the user device and necessary for the working of the malicious software;
a category of the data containing elements of legitimate software; and
a category of the data containing results of the working of the legitimate software.

20. The non-transitory computer readable medium of claim 17, wherein determining whether to perform the banking operation is based on detecting that: the level of security is not lower than a threshold value, or in the event of performing several banking operations, a measure of central tendency of levels of security of performing the several banking operations is not lower than the threshold value.

* * * * *